Figure 1:
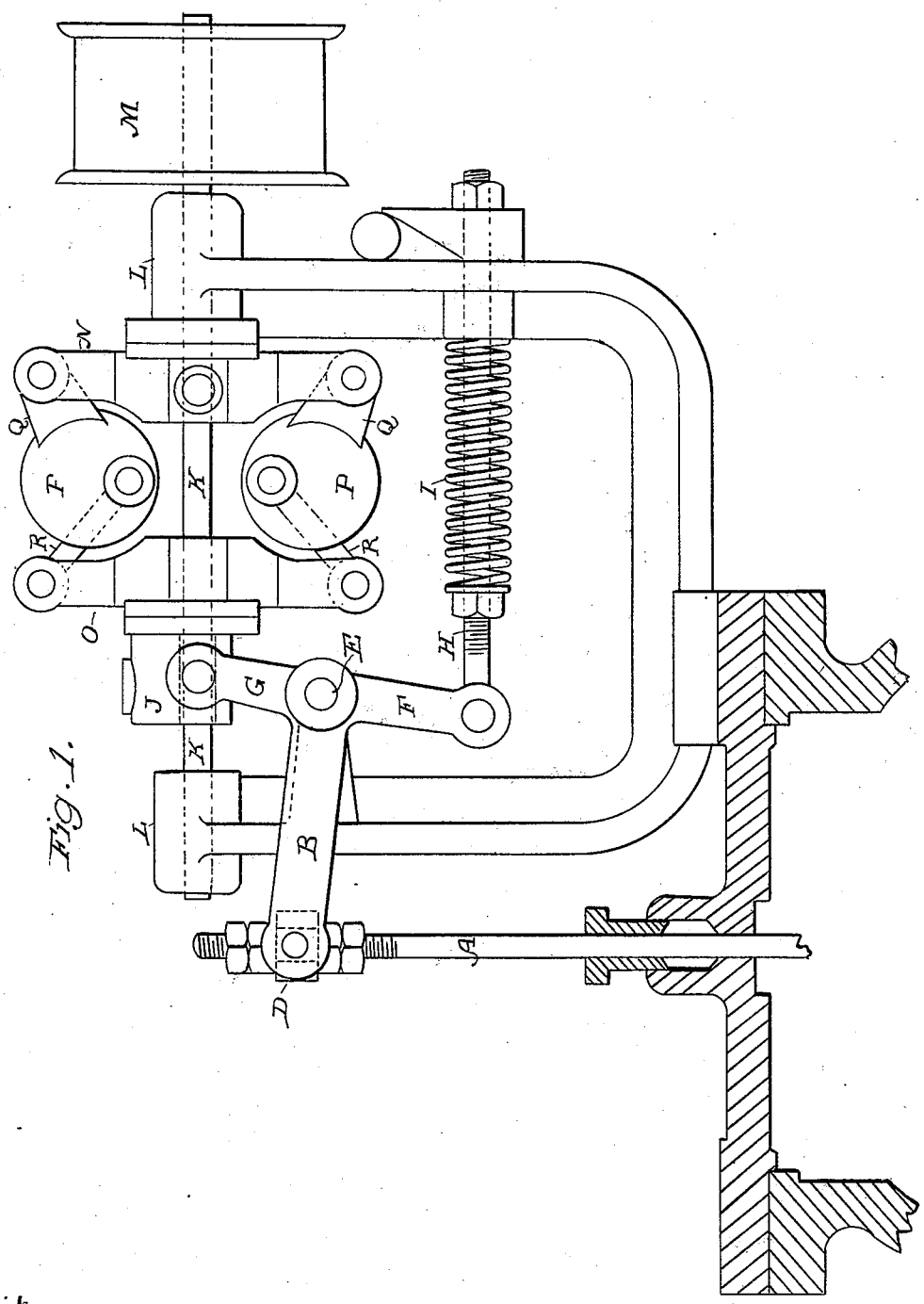

(No Model.) 2 Sheets—Sheet 1.

I. F. THOMPSON.
ENGINE GOVERNOR.

No. 512,411. Patented Jan. 9, 1894.

Witnesses,
J. H. Nouse
J. H. Bayless

Inventor,
Isaac F. Thompson
By Dewey & Co.
Attys

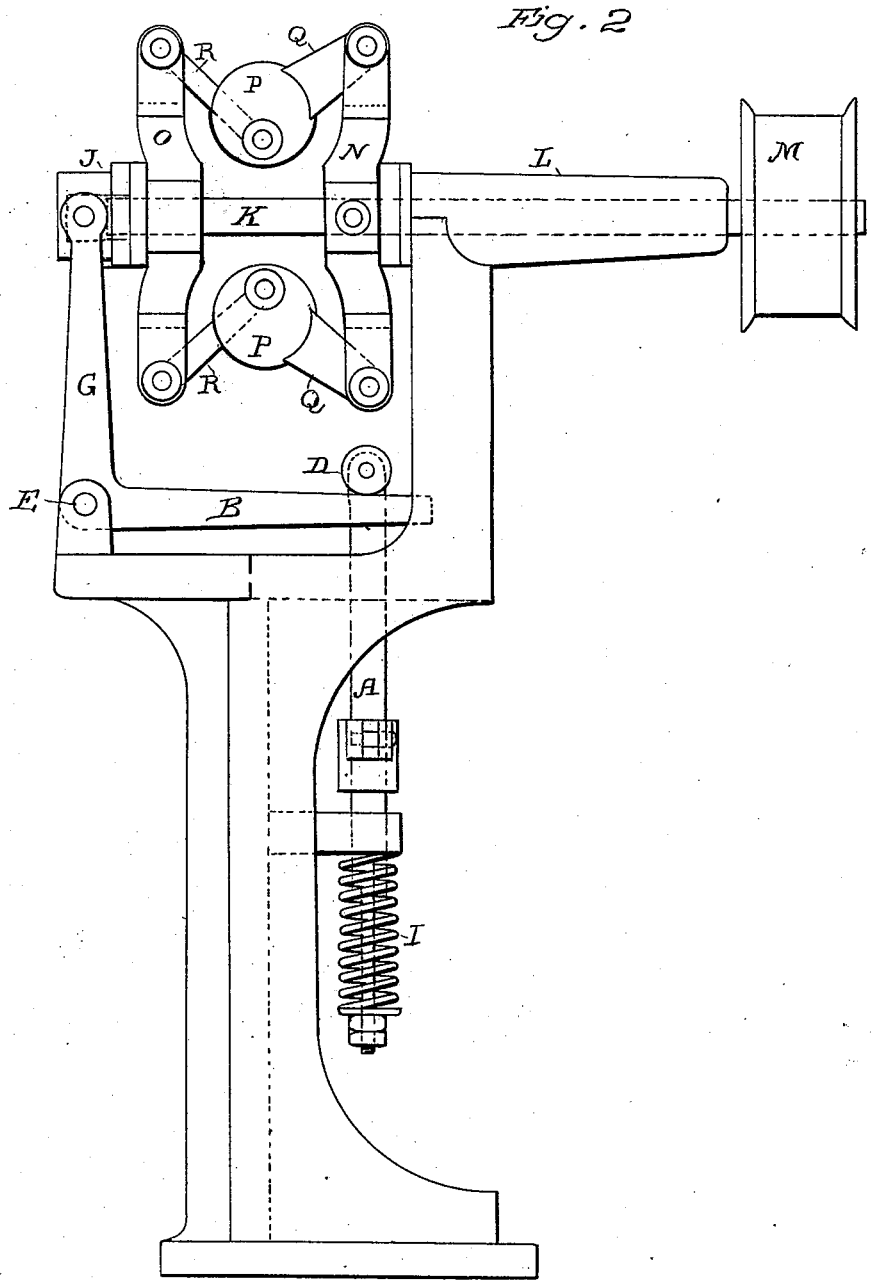

UNITED STATES PATENT OFFICE.

ISAAC FERDINAND THOMPSON, OF SAN FRANCISCO, CALIFORNIA, ASSIGNOR OF ONE-HALF TO WALES L. PALMER, OF SAME PLACE.

ENGINE-GOVERNOR.

SPECIFICATION forming part of Letters Patent No. 512,411, dated January 9, 1894.

Application filed March 17, 1893. Serial No. 466,439. (No model.)

*To all whom it may concern:*

Be it known that I, ISAAC FERDINAND THOMPSON, a citizen of the United States, residing in the city and county of San Francisco, State of California, have invented an Improvement in Engine-Governors; and I hereby declare the following to be a full, clear, and exact description of the same.

My invention relates to a differential spring governor for steam engines.

It consists in certain details of construction which will be more fully explained by reference to the accompanying drawings, in which—

Figure 1 is a side elevation of the apparatus showing one form and spring connection. Fig. 2 shows a second form.

This governor is applicable either to control a valve by which steam is admitted to the engine valve chambers, or it may be connected to actuate directly the cut off mechanism of rotary, slide, or other valves of the Corliss or other well known types.

A is a rod or stem connected at one end with the governor mechanism, and at the other with the valve or cut off actuating or steam controlling mechanism. The outer end of the stem or rod A is connected by a suitable joint or movable bearing, as shown at D, with the main arm B of a T-shaped lever, as shown in Fig. 1, which is fulcrumed at the intersection E of the main portion with the cross arms of the latter, or, as shown in Fig. 2, with a bell crank lever, the object being to give a convenient change of direction to the movements induced by the governor. In geared governors the lever is dispensed with, the movement being direct.

In Fig. 1, one end F of the cross arm connects with a rod H which is surrounded by a compression spring I, the tension of which acts to move the lever so as to open the valve when not otherwise controlled. In Fig. 2, the spring is shown acting directly upon the rod A, the result being the same in either case.

One arm G of the lever connects with a collar J surrounding the driving shaft K, which is suitably journaled in boxes L, supported by a yoke or standard as shown. The shaft is driven by power communicated to a belt pulley M, or by other equivalent means. Upon this shaft K is fixed a driving bar N, and opposite it to another bar O which is adapted to slide longitudinally upon the shaft K, and by its action upon the movable collar J, to force the latter outward or to allow it to be moved toward the center by the action of the spring I, previously described. When the collar is forced outward, it moves the arm G of the lever, and through its connection with the rod A, the valve is partially closed or the cut off mechanism is actuated, the same movement compressing the spring I proportionately. When the collar J is relieved, and allowed to return toward the center, the lever arm G moves with it, and the valve is correspondingly opened, or moved to admit more steam.

Between the two bars N and O, are the governor balls or weights P. These balls have arms Q attached to them which are connected by pins with the driving bar N, and are thus caused to revolve rapidly with the shaft K, when the latter is in rotation.

R are other arms, having the inner ends pivoted to the balls or weights, and the outer ends connected with the movable valve actuating bar O, so that the inner ends of the arms Q and R meet to form internal angles with each other; or so arranged that the points where the arms are pivoted to the bars N and O are farther from the shaft K than the points where they are connected to the balls or weights P P.

The operation will then be as follows:— When the balls are thrown outward by centrifugal force, they act through the two arms Q and R which connect them with the driving and actuating bar N and O respectively, and as these arms normally stand at an angle toward the center with each other, when the governor is stationary, it will be seen that as the balls are thrown outward by centrifugal force, this angle is decreased and the arms gradually approach a position approximately in line with each other, thus acting as a toggle or knee lever in which the power increases as the balls are thrown outward, and the levers approach more nearly in line with each other. When the shaft carrying the balls begin to revolve at a rate of speed sufficient to overcome the tension of the spring I, the balls or weights commence to move outward, and the differential connecting rods force the actuating bar O along the governor shaft, as before described, acting with the increasing power.

To illustrate the differential action with relation to the spring, the following may be stated:—If the governor is running at four hundred revolutions per minute, and at the point when the balls or weights commence to move, suppose them to exert a centrifugal force of thirty-six pounds, then when each of the balls has moved outward half an inch, they will exert a force of seventy-three pounds, of which additional force ten pounds may be stated to be due to the increase in the size of the circle of gyration and consequent increased centrifugal force, and the other twenty-seven pounds to the action of the differential rods. If, when the balls commence to move outward, as above, the spiral spring I has a tension of thirty-six pounds, just corresponding to the initial centrifugal force of the balls, the spring will, when the balls have been moved out a half inch, have a tension due to its compression, equal to seventy-three pounds, or practically balancing the force which the balls have at that point. This balance of the two forces will be approximately maintained, at whatever position the balls are moved to, whereas in governors, as usually made, the balls and their connecting levers or arms being disposed upon angles external to the axis of their revolution, exert their greatest force at point of starting, and as the speed increases and the balls moves outwardly, the centrifugal force also increases, but the changing angle of the arms so modifies the leverage as to produce a progressively lessening power and effect. Contrariwise, the counteracting spring has the least tension at the moment when the balls start, but as the circle increases and the leverage decreases, as above described, the spring exerts a progressively increasing force and effect, an objectionable feature which my construction entirely overcomes, as previously described.

I have, in the present case, shown the shaft which drives the governor balls in a horizontal position, and a belt pulley for applying power to drive it, but it will be manifest that it may be placed in a vertical or other position, and that beveled gearing may be used to drive it if found desirable.

Other modifications of construction are possible for producing the same result in practically the same way, the essence of the invention consisting of the weights so hinged and connected with the differential rods, as to produce the internal angles of connection as shown, and the increasing power as the balls separate by centrifugal action, to balance the increasing tension of the spring.

Having thus described my invention, what I claim as new, and desire to secure by Letters Patent, is—

1. An engine governor consisting of a rod which controls the valve or cut off mechanism, a lever fulcrumed and having one arm connected with the rod and another arm connected with a movable collar slidable upon the governor spindle, a driving bar fixed upon said spindle, a second bar slidable upon the spindle and acting against the movable collar, balls having arms by which they are connected with the driving bar and differential rods or links connecting them with the movable bar, said arms forming with the hinge bars of the balls, angles internal to the centers of the balls, and a compression spring or springs connected with said lever and acting against the centrifugal force of the balls and counterbalancing the same, substantially as herein described.

2. An engine governor consisting of a valve or cut off controlling rod movable to open or close the engine steam supply, a lever arm having one end connected with a compression spring which normally acts to increase the valve opening, weights hinged to a rotary spindle, and rods connecting the weights with an arm and collar slidable upon the spindle to close the valve when the weights are thrown outward by centrifugal force, said rods standing with relation to the weight hinges to form knee levers therewith, whereby the power is increased as the weights are moved outward, and the increasing tension of the spring counterbalanced, substantially as herein eescribed.

In witness whereof I have hereunto set my hand.

ISAAC FERDINAND THOMPSON.

Witnesses:
W. H. QUINN, Jr.,
WM. E. PALMER.